United States Patent
Kim et al.

(10) Patent No.: US 9,172,095 B2
(45) Date of Patent: Oct. 27, 2015

(54) METHOD FOR MANUFACTURING ELECTRODE FOR FUEL CELL COMPRISING NANOCARBON AND CORE-SHELL-STRUCTURED PLATINUM-CARBON COMPOSITE AND THE ELECTRODE FOR FUEL CELL MANUFACTURED BY THE SAME

(71) Applicant: KOREA INSTITUTE OF ENERGY RESEARCH, Daejeon (KR)

(72) Inventors: Hee-Yeon Kim, Daejeon (KR); Seok-yong Hong, Daejeon (KR); Kwang-shik Myung, Daejeon (KR)

(73) Assignee: KOREA INSTITUTE OF ENERGY RESEARCH (KR)

( * ) Notice: Subject to any disclaimer, the term of this patent is extended or adjusted under 35 U.S.C. 154(b) by 176 days.

(21) Appl. No.: 13/938,643

(22) Filed: Jul. 10, 2013

(65) Prior Publication Data

US 2014/0023958 A1    Jan. 23, 2014

(51) Int. Cl.
*H01M 4/88* (2006.01)
*H01M 4/86* (2006.01)
*H01M 4/92* (2006.01)

(52) U.S. Cl.
CPC .......... *H01M 4/8657* (2013.01); *H01M 4/8673* (2013.01); *H01M 4/8817* (2013.01); *H01M 4/8867* (2013.01); *H01M 4/926* (2013.01); *Y02E 60/50* (2013.01)

(58) Field of Classification Search
None
See application file for complete search history.

(56) References Cited

FOREIGN PATENT DOCUMENTS

| CN | 101246963 A | 8/2008 |
|---|---|---|
| JP | 2003528419 A | 9/2003 |
| KR | 100751557 | 8/2007 |
| KR | 100801470 B1 | 1/2008 |
| KR | 100823502 | 4/2008 |

OTHER PUBLICATIONS

Notice of Allowance of Korean Priority Application, Aug. 25, 2014, 5 pages.
"Core/Shell Pt/C Nanoparticles Embendded in Mesoporous Carbon as a Methanol-Tolerant Cathode Catalyst in Direct Methanol Fuel Cells", Zhenhai Wen et. al., Advanced Materials, vol. 20, p. 743-747.
Chinese Office Action, Application No. CN201310284379.9, Apr. 23, 2015, 6 pages.

*Primary Examiner* — Patrick Ryan
*Assistant Examiner* — Wyatt McConnell
(74) *Attorney, Agent, or Firm* — Mark E. Bandy; Rankin, Hill & Clark LLP

(57) ABSTRACT

The present subject matter provides a method of manufacturing an electrode for a fuel cell, in which nanocarbons are grown on the surface of a substrate for a fuel cell using a process of simultaneously gasifying a platinum precursor and a carbon precursor, and simultaneously core-shell-structured platinum-carbon composite catalyst particles are highly dispersed between nanocarbons The subject matter also provides an electrode for a fuel cell, manufactured by the method. This method is advantageous in that an electrode for a fuel cell having remarkably improved electrochemical performance and durability can be manufactured by a simple process.

13 Claims, 4 Drawing Sheets

METHOD FOR MANUFACTURING ELECTRODE FOR FUEL CELL COMPRISING NANOCARBON AND CORE-SHELL-STRUCTURED PLATINUM-CARBON COMPOSITE AND THE ELECTRODE FOR FUEL CELL MANUFACTURED BY THE SAME

CROSS REFERENCE TO RELATED APPLICATIONS

This application claims the benefit of Korean Patent Application No. 10-2012-0078362, filed with the Korean Intellectual Property Office on Jul. 18, 2012, the disclosure of which is incorporated herein by reference in its entirety.

BACKGROUND

1. Technical Field

The present subject matter relates to a method of manufacturing an electrode for a fuel cell and an electrode for a fuel cell manufactured by the method. More particularly, the present subject matter relates to a method of manufacturing an electrode for a fuel cell, in which nanoparticles of carbon or "nanocarbons" are grown on the surface of a substrate for a fuel cell using a co-gasification process of a platinum precursor and a carbon precursor, and simultaneously core-shell-structured platinum-carbon composite catalyst particles are highly dispersed between nanocarbons, thereby obtaining an electrode for a fuel cell having improved electroconductivity, activity and durability, and to an electrode for a fuel cell, manufactured by the method.

2. Description of the Related Art

Recently, with the exhaustion of crude oil and the increase of oil prices, the development of novel energy sources different from conventional energy sources has been required, and thus the necessity for developing fuel cells has been increased. However, although research into fuel cells has been conducted for several decades, the commercialization of fuel cells has proceeded slowly because the production cost of an electrode catalyst for a fuel cell was high and the durability of the electrode catalyst is very low. Therefore, research into improving the performance and durability of an electrode for a fuel cell has lately been attempted actively and variously. Generally, research results, such as high dispersion of a platinum catalyst, prevention of electrode corrosion and catalyst detachment by the reformation of a carbon support, improvement of durability by controlling the properties of carbon bonded with metal particles, and the like have been proposed. However, to date, remarkable research results have not been presented, and solutions for basically improving the performance and durability of a platinum catalyst also have not been presented.

Korean Patent Registration No. 10-823502 describes related art.

SUMMARY

Accordingly, the present subject matter has been devised to solve the above-mentioned problems, and an object of the present subject matter is to provide a method of manufacturing an electrode for fuel cell, in which an electrode for fuel cell having improved performance and durability can be manufactured by a simple process.

Another object of the present subject matter is to provide an electrode for fuel cell, which is configured such that nanocarbons for improving electroconductivity and increasing a reaction area are formed on the surface of a substrate, and core-shell-structured platinum-carbon composite particles exhibiting remarkable activity and durability in a fuel cell reaction are dispersed on the surface of the nanocarbons.

In order to accomplish the above objects, an aspect of the present subject matter provides a method of manufacturing an electrode for fuel cell, including the steps of: (S1) pretreating a surface of a substrate; (S2) doping the pretreated surface of the substrate with a catalyst for growing nanocarbons; (S3) disposing the substrate doped with the catalyst in a reactor and preheating this substrate to predetermined temperature; (S4) providing a platinum precursor and a carbon precursor in the form of a gas from each gasifier; and (S5) supplying the gaseous platinum precursor and carbon precursor to the contactlessly-preheated reactor using a carrier gas to form nanocarbons and a core-shell-structured platinum-carbon composite on the surface of the substrate doped with the catalyst.

Another aspect of the present subject matter provides an electrode for fuel cell, including: a substrate including nanocarbons on a surface thereof, wherein a core-shell-structured platinum-carbon composite is dispersed on a surface of the nanocarbons.

BRIEF DESCRIPTION OF THE DRAWINGS

The above and other objects, features and advantages of the present subject matter will be more clearly understood from the following detailed description taken in conjunction with the accompanying drawings, in which.

DETAILED DESCRIPTION OF THE EMBODIMENTS

Figure 1:
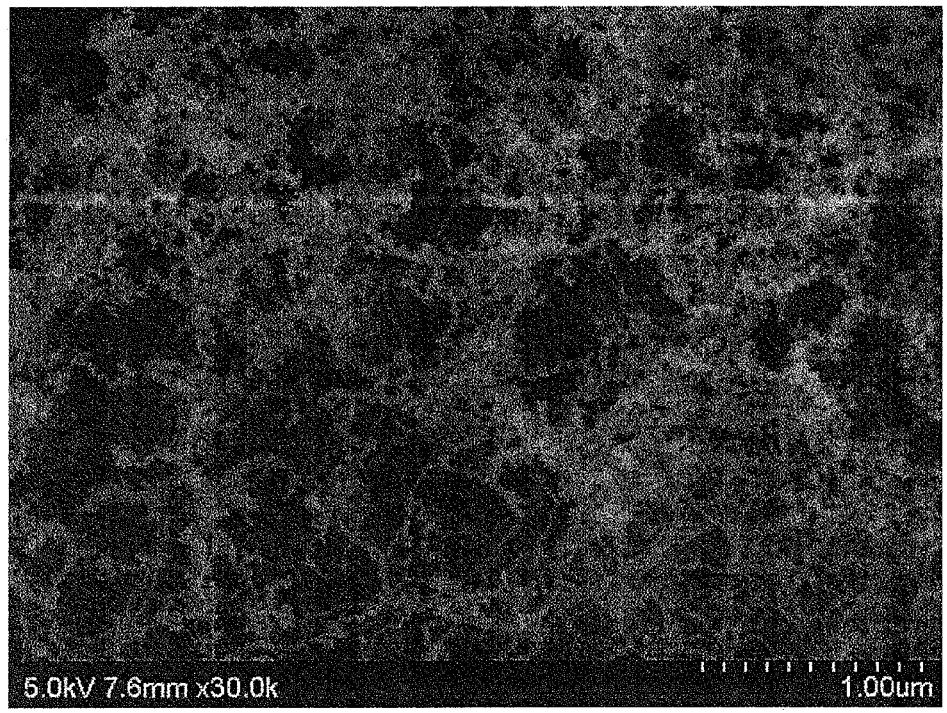
FIG. 1 is a scanning electron microscope (SEM) photograph showing the surface of an electrode for fuel cell, manufactured in Example 1.

Hereinafter, a method of manufacturing an electrode for a fuel cell according to the present subject matter will be stepwisely described in detail.

First, the surface of a substrate for a fuel cell electrode is pretreated (S1).

This step is carried out in order to synthesize nanocarbons on the surface of the substrate for a fuel cell electrode. As the substrate for a fuel cell electrode, carbon paper (carbon fiber paper or graphite fiber paper) may be used. The thickness, porosity, size and the like of the carbon paper are not particularly limited, and various types of carbon paper may be applied.

According to an embodiment of the present subject matter, the step S1 may sequentially include the steps of: washing and drying a substrate; impregnating the washed and dried substrate with sulfuric acid or a mixed acid of sulfuric acid and nitric acid and treating this substrate with ultrasonic waves; and washing and drying the ultrasonically-treated substrate.

More specifically, the surface of the substrate for a fuel cell electrode is washed with a cleaning solvent such as ethanol or the like, and then the substrate is dried in an oven at about 100 to about 120° C., preferably at 110° C., for 6 hours or more, and preferably for about 12 to about 24 hours. Thereafter, in order to increase the wettability of the surface of the substrate, the substrate is immersed in sulfuric acid (98%) or a mixed acid of sulfuric acid and nitric acid (14 M nitric acid and 98% sulfuric acid are mixed at a volume ratio of 1:1), and is then treated with ultrasonic waves for about 30 to about 360 minutes using an ultrasonic bath (60 kHz). Subsequently, the substrate is washed with a cleaning solvent such as distilled water or the like several times to completely remove acid components, and is then dried in the air for 12 hours and then further dried in an oven at about 100 to about 120° C., preferably at 110° C., for 12 hours or more, and preferably for about 6 to about 24 hours.

Thereafter, the surface of the pretreated substrate is doped with a catalyst for growing nanocarbons (S2).

In this step, in order to grow nanocarbons on the surface of the substrate pretreated in the step S1, the surface thereof is doped with a catalyst to be used as a seed.

According to an embodiment of the present subject matter, the step S2 may sequentially include the steps of: impregnating a substrate with a precursor of a catalyst for growing nanocarbons and applying ultrasonic waves to the substrate; maintaining the substrate for a predetermined amount of time; and drying the substrate.

The precursor of the catalyst for growing nanocarbons according to the present subject matter may be selected from the group consisting of an aqueous nickel nitrate solution, an aqueous cobalt-nickel nitrate solution and a solution obtained by dissolving iron in alcohol or benzene. It is preferred that ferrocene be used as iron.

More specifically, the precursor of the catalyst for growing nanocarbons is formed into about 0.2 to about 0.5 M solution, the pretreated substrate is immersed in this solution, and then ultrasonic waves (60 kHz) are applied thereto for about 30 to about 360 minutes. Then, this substrate is left for about 12 to about 24 hours. Then, this substrate is dried in the air for about 12 to about 24 hours, and then further dried in an oven at about 100 to about 120° C., preferably at 110° C., for about 12 to about 24 hours to prepare a substrate for a fuel cell electrode doped with a catalyst necessary for growing nanocarbons.

Next, the substrate doped with the catalyst prepared in the step S2 is disposed in a reactor, and is then preheated to predetermined temperature (S3).

Preferably, the substrate doped with the catalyst is disposed in a reactor, and nitrogen is introduced into the reactor at room temperature for 1 hour or more to remove impurities existing in the reactor, thus forming nanocarbons and a core-shell-structured platinum-carbon composite on the surface of the substrate.

In this step, the preheating temperature of the reactor is closely related to the synthesis of nanocarbons and the synthesis temperature of a core-shell-structured platinum-carbon composite. A synthesis reaction takes place as soon as a gaseous carbon precursor and a gaseous platinum precursor are introduced into the preheated reactor. Therefore, in order to obtain a desired composite, the preheating temperature in this step may be suitably adjusted.

Preferably, the reactor may be preheated in a temperature range of about 400 to about 1100° C. More preferably, in order to effectively grow carbon nanotubes, the reactor may be preheated in a temperature range of about 600 to about 1100° C. In this temperature range, carbon nanotube-type nanocarbon and a core-shell-structured platinum-carbon composite can be formed by a one-step process. Next, a platinum precursor and a carbon precursor are provided in the form of a gas from their respective gasifiers (S4).

This step may be carried out in various manners depending on whether or not each of the precursors is liquid or gaseous. For example, (a) a liquid platinum precursor and a liquid carbon precursor may be simultaneously gasified by their respective gasifiers, or (b) a liquid platinum precursor may be gasified by one gasifier and a gaseous carbon precursor may be provided to another gasifier.

Specifically, a liquid platinum precursor is supplied to one gasifier, a liquid carbon precursor is supplied to another gasifier, and then each of the gasifiers is heated to the boiling point of each of the precursors, thus simultaneously gasifying the liquid platinum precursor and the liquid carbon precursor. Further, when a gaseous carbon precursor is used, this gaseous carbon precursor may be directly provided into a gasifier.

The platinum precursor used in this step is used to form a core of a platinum-carbon composite. As the platinum precursor, gasifiable materials may be used. Preferably, the platinum precursor may be selected from the group consisting of (trimethyl)methylcyclopentadienyl platinum, platinum(II) acetylacetonate, tetrakis(trifluorophosphine) platinum(0), tetrakis(triphenylphosphine) platinum(0), platinum(II) hexafluoroacetylacetonate, trimethyl(methylcyclopentadienyl) platinum(IV), and (1,5-cyclooctadiene)dimethyl platinum(II). More preferably, it is advantageous in terms of process cost that precursors, which can be easily gasified at room temperature, are used as the platinum precursor. In this case, it is possible to minimize the occurrence of the problem of the precursor being condensed or coated in a connection pipe provided between the gasifier and the reactor.

The carbon precursor used in this step is used to form a shell of a platinum-carbon composite or to form nanocarbons. The carbon precursor may be a liquid carbon precursor selected from the group consisting of methanol, ethanol, acetone, benzene, toluene and xylene, or may be a gaseous carbon precursor such as methane or acetylene.

The gasifier used in this step may be a commonly-known gasifier or a directly-made gasifier. Generally, the gasifier may be made of a platinum material or a glass material (quartz glass or Pyrex glass). It is advantageous that the gasifier be made of a glass material because the glass material is a stable material by which the state and residual quantity of contents in the gasifier can be observed at constant temperature and which does not react with a precursor.

In this step, since the specific gasification condition of a precursor is different according to the kind of the selected precursor, it is required to suitably adjust the gasification temperature thereof. According to an embodiment of the present subject matter, when (trimethyl)methylcyclopentadienyl platinum is used as the platinum precursor, it can be gasified at a temperature of about 50 to about 70° C. Further, when acetone is used as the carbon precursor, it can be gasified at a temperature of about 50 to about 60° C. According to another embodiment of the present subject matter, when (1,5-cyclooctadiene)dimethyl platinum(II) is used as the platinum precursor, it can be gasified at a high temperature of 100° C. or more with it being dissolved in a solvent such as benzene. In this case, this platinum precursor may be gasified by putting a glass-made gasifier into an oven or by winding a middle connection pipe connecting a proportioning pump and a reactor with heating tape while transferring a predetermined amount of a precursor solution using the proportioning pump.

Finally, the gaseous platinum precursor and gaseous carbon precursor are contactlessly supplied to the preheated reactor using a carrier gas to form nanocarbons and a core-shell-structured platinum-carbon composite on the surface of the substrate doped with the catalyst (S5).

In this step, each of the gaseous precursors is contactlessly supplied to the reactor by a carrier gas, for example, is supplied to the reactor through an additional supply line. Therefore, gasified precursors are joined with each other at the inlet of the reactor. Meanwhile, when the gasified precursors are joined with each other in a transfer pathway, there is a problem in that undesired side reactions take place or the wall of the transfer pathway is coated with these gasified precursors.

The carrier gas used in this step serves to prevent precursors from being condensed and to prevent side reactions from taking place. As the carrier gas, oxygen, hydrogen or nitrogen gas may be used. However, in order to minimize the side reactions taking place when the platinum precursor moves in the connection pipe, it is preferred that inert gas, such as nitrogen, argon, helium or the like, be used as the carrier gas.

In this step, each of the gaseous precursors begins to flow into the preheated reactor, and simultaneously the synthesis of an electrode for fuel cell, which is composed of a finally-targeted core-shell-structured platinum-carbon composite, starts. In this case, the thickness of a catalyst layer increases with the passage of time. The synthesis thereof is conducted in the reactor preheated in the step S4 at a temperature of about 400 to about 1000° C. for 30 minutes to 6 hours. Generally, conventional nanocarbons, such as carbon nanotubes, carbon nanofibers or carbon nanowires, are grown at a high temperature of 700° C. or more, whereas the electrode for fuel cell according to the present subject matter, which is composed of nanocarbons and a core-shell-structured platinum-carbon composite, can be synthesized at a low temperature of about 500° C., and the form of the composite formed on the surface of the electrode can be controlled. Further, as the synthesis temperature increases, the crystallinity of nanocarbons is improved, whereas the crystallinity of a platinum-carbon core-shell structure is changed. Further, when the flow ratio of a carbon precursor and a platinum precursor is suitably adjusted, the form of a platinum-carbon core-shell structure, that is, the thickness of a shell and the size of platinum particles can be adjusted.

Further, the present subject matter provides an electrode for fuel cell, including: a substrate including nanocarbons on the surface thereof, wherein a core-shell-structured platinum-carbon composite is dispersed on the surface of the nanocarbons.

The core-shell-structured platinum-carbon composite of the present subject matter is configured such that a core is made of platinum, a shell is made of carbon, and the core is partially or entirely covered by the shell.

Further, it is preferred that the nanocarbons be carbon nanofibers or carbon nanotubes.

According to the electrode for fuel cell of the present subject matter, nanocarbons and a core-shell-structured platinum-carbon composite are impregnated on the surface of a substrate used as a support, so an additional electrode manufacturing process including several steps is not required, and a high-performance electrode for fuel cell can be synthesized by one-step process, thereby simplifying a manufacturing process, reducing a process cost and improving the performance and durability of an electrode.

Hereinafter, the present subject matter will be described in more detail with reference to the following Examples. These Examples are set forth to illustrate the present subject matter, and the scope of the present subject matter is not limited thereto.

Example 1

First, a substrate for an electrode, for example, graphite paper, was surface-washed with ethanol, and was then dried in an oven at 110° C. for 12 hours. The substrate was immersed into a mixed acid (which was obtained by mixing 14 M nitric acid with 98% sulfuric acid at a volume ratio of 1:1) in order to increase surface wettability, treated with ultrasonic waves (60 kHz) for 30 minutes in an ultrasonic bath, sufficiently washed with distilled water to completely remove the mixed acid, dried in the air for 12 hours, and then further dried in an oven at 110° C. for 12 hours, thereby pretreating the substrate.

Subsequently, the dried substrate was coated with a nickel catalyst which is used as a seed for growing nanocarbons. As a nickel precursor, an aqueous nickel nitrate [$Ni(NO_3)_2 \cdot 6H_2O$] solution (0.2 M) was used. The pretreated substrate was immersed into the aqueous nickel nitrate solution, treated with ultrasonic waves (60 kHz) for 30 minutes, and then further immersed into the aqueous nickel nitrate solution for 6 hours. These procedures were repeated three times. The substrate treated in this way was dried in the air for 24 hours, and then further dried in an oven at 110° C. for 12 hours to prepare a catalyst-supported electrode necessary for growing nanocarbons.

Subsequently, precursor for forming nanocarbons and a core-shell-structured platinum-carbon composite were provided. Methane (99.998%) was used as a carbon precursor, and the flow rate thereof was adjusted in accordance with the volume of a quartz reactor for composite synthesis. (Trimethyl)methylcyclopentadienyl platinum ($MeCpPtMe_3$, 99%, STREM) was used as a platinum precursor, the flow rate thereof was adjusted by supplying high-purity nitrogen, and gasification temperature was set to 60° C. For example, when a cylindrical reactor having a section area of 20 mm$^2$ was used, the flow rate of methane was set to 3 mL/min, the flow rate of nitrogen for gasifying a platinum precursor was set to 20 mL/min, and high-purity nitrogen was additionally supplied to the reactor at a flow rate of 17 mL/min, and thus the total flow rate was set to 50 mL/min. A connection pipe provided between the gasifier and the reactor was wound with heating tape, and gasification temperature was set to 60° C., thus preventing gaseous precursors from being condensed. Further, precursors were first brought into contact with each other at the inlet of the reactor, thus minimizing the unnecessary side reactions.

Prior to the synthesis reaction of a composite, nitrogen was supplied to a quartz reactor at a flow rate of 50 mL/min to remove impurities existing in the quartz reactor, and the quartz reactor was preheated to 700° C., which is the synthesis temperature of a composite, at a heating rate of 10° C./min, thus preparing a synthesis reaction. The start time of the synthesis reaction of nanocarbons and a platinum-carbon core-shell structure was set to the time at which each precursor arrives at the inlet of the reactor, and reaction time was maintained at 2 hours, thereby manufacturing an electrode for a fuel cell including nanocarbons and a core-shell-structured platinum-carbon composite.

Test Example 1

Scanning Electron Microscope (SEM) Analysis

The surface of the electrode for a fuel cell including nanocarbons and a core-shell-structured platinum-carbon composite, manufactured in Example 1, was analyzed using a scanning electron microscope, and the results thereof are shown in FIG. 1. As shown in FIG. 1, it can be ascertained that carbon nanotubes and platinum-carbon core-shell particles are uniformly distributed on the surface of the electrode based on carbon paper to form a composite.

Test Example 2

Transmission Electron Microscope (TEM) Analysis

Figure 2:
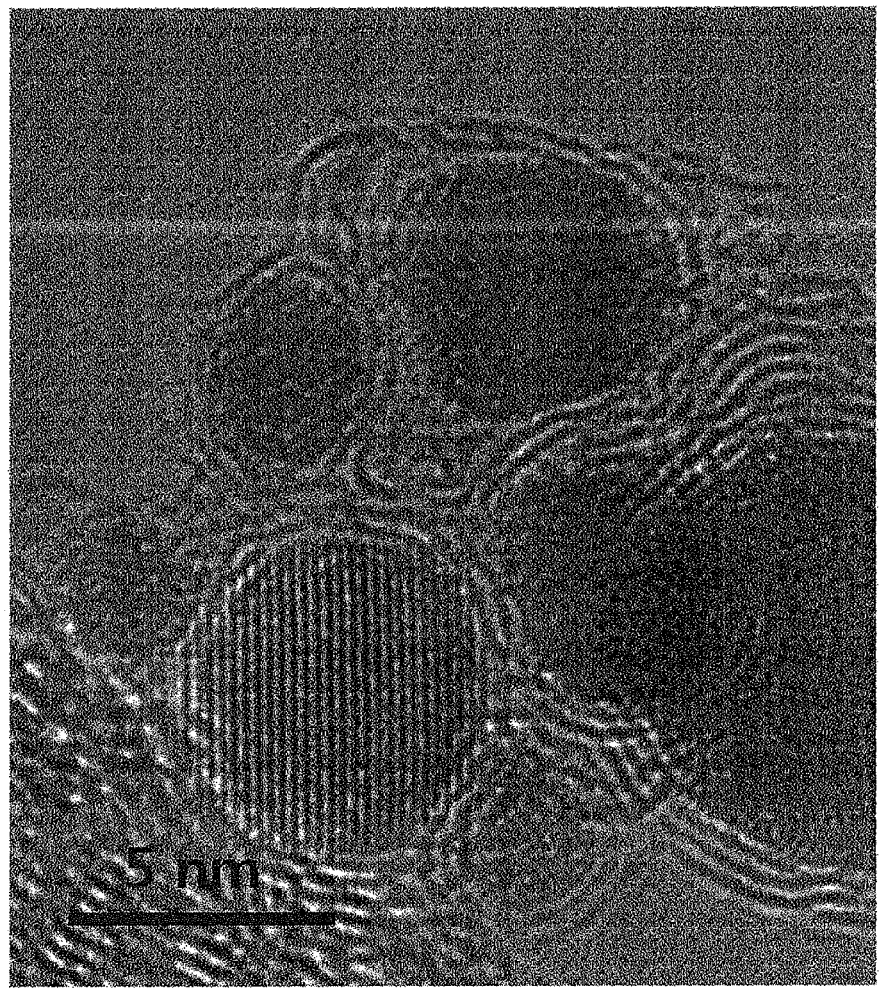
FIG. 2 is a transmission electron microscope (TEM) photograph showing the surface of an electrode for fuel cell, manufactured in Example 1.
Figure 3:
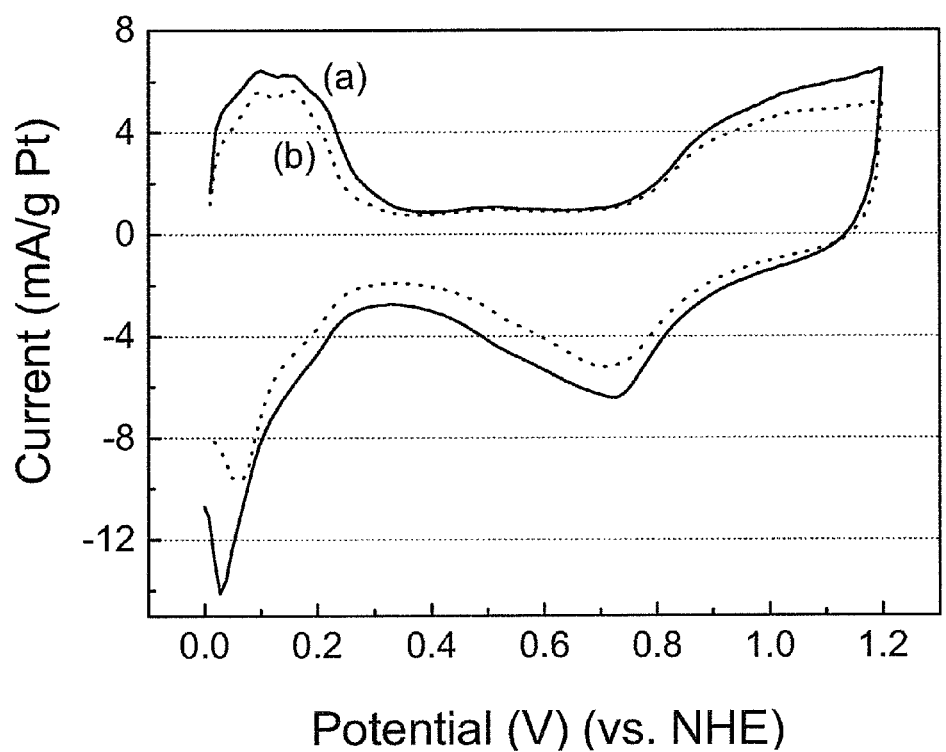
FIG. 3 is a graph showing the result of measuring the performance of an electrode for fuel cell, manufactured in Example 1.
Figure 4:
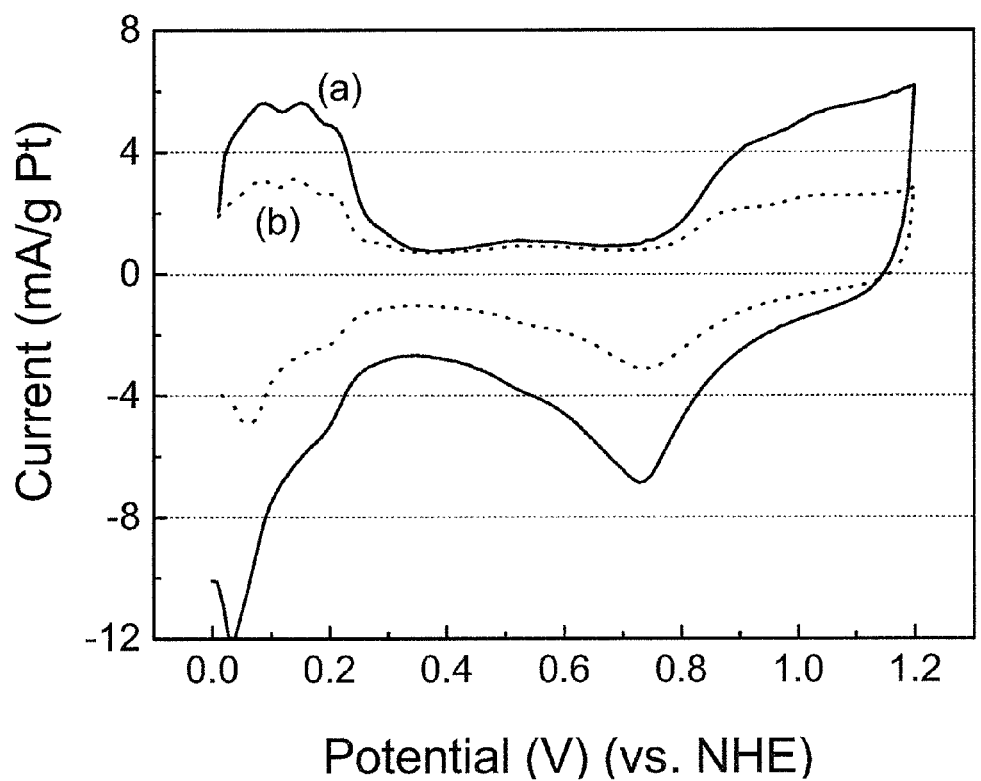
FIG. 4 is a graph showing the result of measuring the performance of a conventional electrode for fuel cell.

In the electrode for a fuel cell including nanocarbons and a core-shell-structured platinum-carbon composite, manufactured in Example 1, the carbon nanotubes and platinum-carbon core-shell structure constituting the surface of the electrode were analyzed using a transmission electron microscope, and the results thereof are shown in FIG. 2. As shown in FIG. 2, single platinum-carbon core-shell nanoparticle was dispersed on the surface of a carbon nanotube, or 3 to 5 platinum-carbon core-shell nanoparticles were dispersed on the surface of a carbon nanotube in the form of a cluster. In the case of a conventional carbon black-supported platinum catalyst, when particles are dispersed on the surface of an electrode, they are generally dispersed on the surface thereof in the form of a cluster, and, in this case, the particles overlapping each other are excluded from catalytic active sites. However, in the case of the electrode manufactured in Example 1, even when platinum-carbon core-shell nanoparticles are clustered, electrons, reactants and reaction products can be transferred through gaps (pores) between carbon shells, thus preventing the reduction in active sites of platinum catalyst particles.

Test Example 3

Performance Test of Electrode for Fuel Cell

The electrochemical performance and durability of the electrode for a fuel cell (Pt—C/CNT/C, 18 wt % Pt) including nanocarbons and a core-shell-structured platinum-carbon composite, manufactured in Example 1, and a conventional electrode for a fuel cell including a commercially available catalyst (Pt/C, 20 wt % Pt) were tested. The electrochemical performance thereof was conducted by coating a rotating disk electrode (RDE) with synthesized nanoparticles and then performing a cyclic voltammetry (CV) analysis using a potentiostat (Biologic sp-50). The CV analysis was performed under the condition that an aqueous 0.5M $H_2SO_4$ solution was used at room temperature, potential was applied in a voltage of 1.2 V, a normal hydrogen electrode was used, and scan rate was set to 20 mV/s.

From the test results, it can be ascertained that, when RDE was manufactured based on the same platinum amount (0.3 mg Pt/cm$^2$), the initial activity of the electrode of Example 1 was higher than that of a conventional Pt/C electrode including a commercially available catalyst by about 16%. Further, it can be ascertained that, when tests of measuring the durability of a catalyst were repeatedly conducted at 1000 cycles, the activity of the electrode of Example 1 was maintained by 86% compared to the initial activity thereof, whereas the activity of the conventional Pt/C electrode was maintained by only 59% compared to the initial activity thereof. Such results are explained by the composite effect of a platinum catalyst and carbon nanotubes. That is, a commercially available catalyst uses carbon black as a support, but the electrode of the present subject matter is configured such that platinum-carbon core-shell particles are dispersed on the surface of a carbon nanotube. Carbon black is amorphous carbon, but the platinum-carbon core-shell is a carbon composite having a graphite structure. Therefore, the electrode of the present subject matter is advantageous in that its physical and chemical strength is high in an electrochemical reaction, and that a carbon layer hardly corrodes. Further, the active sites of a catalyst having a platinum-carbon core-shell structure are not agglomerated according to the progress of a reaction, and are not detached by the corrosion of carbon, thus preventing the inactivation of the electrode.

As described above, a conventional electrode for fuel cell is manufactured by a complicated process including the steps of preparing a catalyst (impregnating-drying-aging), preparing a catalyst slurry; coating a substrate with the catalyst slurry, drying the substrate coated with the catalyst slurry, and the like. However, since the method of manufacturing an electrode for a fuel cell according to the present subject matter can manufacture an electrode for a fuel cell having high performance and high durability for a short period of time at low cost using one-step process, this method is suitable for mass production. Further, according to the method of the present subject matter, composites having various properties and composition ratios can be synthesized by changing synthesis temperature and precursor composition.

Further, the nanocarbons included in the catalyst layer of the electrode for a fuel cell according to the present subject matter serve to improve electroconductivity and increase a reaction area, and the core-shell-structured platinum-carbon composite included therein serves to improve catalytic activity and durability.

Many other benefits will no doubt become apparent from future application and development of this technology.

All patents, published applications, and articles noted herein are hereby incorporated by reference in their entirety.

Although the preferred embodiments of the present subject matter have been disclosed for illustrative purposes, those skilled in the art will appreciate that various modifications, additions and substitutions are possible, without departing from the scope and spirit of the subject matter as disclosed in the accompanying claims.

What is claimed is:

1. A method of manufacturing an electrode for a fuel cell, comprising the steps of:
   (S1) pretreating a surface of a substrate;
   (S2) doping the pretreated surface of the substrate with a catalyst for growing nanocarbons;
   (S3) disposing the substrate doped with the catalyst in a reactor and preheating the reactor to predetermined temperature;
   (S4) providing a platinum precursor and a carbon precursor in the form of a gas; and
   (S5) supplying the gaseous platinum precursor and carbon precursor contactlessly to the preheated reactor using a carrier gas to form nanocarbons and a core-shell-structured platinum-carbon composite on the surface of the substrate doped with the catalyst.

2. The method of claim 1, wherein the step S1 sequentially comprises the steps of:
   washing and drying the substrate;
   impregnating the washed and dried substrate with sulfuric acid or a mixed acid of sulfuric acid and nitric acid and treating this substrate with ultrasonic waves; and
   washing and drying the ultrasonically-treated substrate.

3. The method of claim 2, wherein, in the step S1, the substrate is carbon paper.

4. The method of claim 1, wherein the step S2 sequentially comprises the steps of:
   impregnating the substrate with a precursor of a catalyst for growing nanocarbons and applying ultrasonic waves to the substrate;

maintaining the substrate for a predetermined amount of time; and drying the substrate.

5. The method of claim 1, wherein the precursor of the catalyst for growing nanocarbons is selected from the group consisting of an aqueous nickel nitrate solution, an aqueous cobalt-nickel nitrate solution and a solution obtained by dissolving iron in alcohol or benzene.

6. The method of claim 1, wherein, in the step S3, the reactor is preheated in a temperature range of 400 to 1100° C.

7. The method of claim 1, wherein, in the step S4, (a) a liquid platinum precursor and a liquid carbon precursor are simultaneously gasified by respective gasifiers, or (b) a liquid platinum precursor is gasified by one gasifier and a gaseous carbon precursor is provided to another gasifier.

8. The method of claim 1, wherein the platinum precursor is selected from the group consisting of (trimethyl)methylcyclopentadienyl platinum, platinum(II) acetylacetonate, tetrakis(trifluorophosphine) platinum(0), tetrakis(triphenylphosphine) platinum(0), platinum(II) hexafluoroacetylacetonate, trimethyl(methylcyclopentadienyl) platinum(IV), and (1,5-cyclooctadiene)dimethyl platinum(II).

9. The method of claim 7, wherein the liquid carbon precursor is selected from the group consisting of methanol, ethanol, acetone, benzene, toluene, and xylene.

10. The method of claim 7, wherein the gaseous carbon precursor is methane or acetylene.

11. The method of claim 1, wherein, in the step S5, the carrier gas is oxygen, hydrogen, argon, helium or nitrogen gas.

12. The method of claim 1, wherein, in the step S5, temperature is maintained around the boiling point of the gasified precursor to prevent the gasified precursor from being condensed.

13. The method of claim 1, wherein the nanocarbons are carbon nanofibers or carbon nanotubes.

* * * * *